United States Patent
Botes (10) Patent No.: US 9,783,739 B2
(45) Date of Patent: Oct. 10, 2017

(54) FISCHER-TROPSCH SYNTHESIS

(71) Applicant: SASOL TECHNOLOGY PROPRIETARY LIMITED, Johannesburg (ZA)

(72) Inventor: Frederick Gideon Botes, Parys (ZA)

(73) Assignee: Sasol Technology Propietary Limited, Johannesburg (ZA)

(*) Notice: Subject to any disclaimer, the term of this patent is extended or adjusted under 35 U.S.C. 154(b) by 0 days.

(21) Appl. No.: 15/121,274

(22) PCT Filed: Mar. 19, 2015

(86) PCT No.: PCT/IB2015/052022
§ 371 (c)(1),
(2) Date: Aug. 24, 2016

(87) PCT Pub. No.: WO2015/145311
PCT Pub. Date: Oct. 1, 2015

(65) Prior Publication Data
US 2017/0022423 A1 Jan. 26, 2017

Related U.S. Application Data

(60) Provisional application No. 61/969,351, filed on Mar. 24, 2014.

(30) Foreign Application Priority Data

Mar. 24, 2014 (ZA) .................................. 2014/02159

(51) Int. Cl.
*C10G 2/00* (2006.01)

(52) U.S. Cl.
CPC ............... *C10G 2/332* (2013.01); *C10G 2/30* (2013.01); *C10G 2/50* (2013.01); *C10G 2300/4006* (2013.01); *C10G 2300/4043* (2013.01)

(58) Field of Classification Search
CPC . C10G 2/30; C10G 2/50; C10G 2/332; C10G 2300/4043; C10G 2300/4006
See application file for complete search history.

(56) References Cited

U.S. PATENT DOCUMENTS

| 4,279,830 A | 7/1981 | Haag et al. |
| 2005/0113463 A1 | 5/2005 | O'Rear et al. |

(Continued)

OTHER PUBLICATIONS

Riedel et al., "Comparative study of Fischer-Tropsch synthesis with H2/CO and H2/CO2 syngas using Fe- and Co-based catalysts" Applied Catalysis A: General, vol. 186, No. 1-2, Oct. 4, 1999, pp. 201-213.

(Continued)

*Primary Examiner* — Jafar Parsa
(74) *Attorney, Agent, or Firm* — Senniger Powers LLP (57) ABSTRACT

A Fischer-Tropsch synthesis process (10) includes feeding gaseous reactants (20) including at least CO, $H_2$ and $CO_2$ into a reactor (14) holding an iron-based catalyst. The $H_2$ and CO are fed in a $H_2$:CO molar ratio of at least 2:1 and the $CO_2$ and CO are fed in a $CO_2$:CO molar ratio of at least 0.5:1. The reactor (14) is controlled at an operating temperature in the range from about 260° C. to about 300° C. A liquid product (22) and a gaseous product (24) including hydrocarbons, CO, $H_2$, water and $CO_2$ are withdrawn from the reactor (14).

20 Claims, 3 Drawing Sheets

(56) References Cited

U.S. PATENT DOCUMENTS

2009/0317669 A1    12/2009  Hildebrandt et al.
2015/0073188 A1*   3/2015   Floudas ................ C10G 35/00
                                                        585/332

OTHER PUBLICATIONS

International Search Report, PCT/IB2015/052022, dated Jun. 22, 2015, 4 pages.
Written Opinion, PCT/IB2015/052022, dated Jun. 22, 2015, 5 pages.

* cited by examiner

FISCHER-TROPSCH SYNTHESIS

This application is a U.S. national stage application of International Patent Application No. PCT/162015/052022, filed Mar. 19, 2015, and claims the benefit of South African Application No. 2014/02159, filed Mar. 24, 2014 and U.S. Provisional Application No. 61/969,351, filed Mar. 24, 2014, the entire disclosures of which are incorporated herein by reference.

This invention relates to Fischer-Tropsch synthesis. In particular, the invention relates to a Fischer-Tropsch synthesis process.

In the well-known Fischer-Tropsch (FT) synthesis process, a gaseous reactant which includes carbon monoxide (CO) and hydrogen ($H_2$), commonly referred to as synthesis gas or syngas, is converted to a range or slate of hydrocarbon products, ranging from normally gaseous to waxy material, and water. Some of the catalysts used for Fischer-Tropsch synthesis have significant activity for the water gas shift (WGS) reaction and are generally referred to as shifting FT catalysts. The WGS reaction, wherein water (typically available as a product from the Fischer-Tropsch synthesis process) reacts with CO to form $CO_2$ and $H_2$ via a reaction represented by Equation 1, is therefore a side-reaction that can occur concomitantly with the Fischer-Tropsch synthesis reaction when these so-called shifting FT catalysts are used.

$$CO + H_2O \leftrightarrow CO_2 + H_2 \qquad 1$$

The formation of $CO_2$ by shifting FT catalysts is usually undesirable in a commercial Fischer-Tropsch synthesis process since it reduces the amount of CO that can be converted to desired Fischer-Tropsch products.

Whereas the Fischer-Tropsch synthesis reaction is for practical purposes irreversible under commercial Fischer-Tropsch synthesis process conditions, the reversibility of the WGS reaction of Equation 1 may be relevant at such process conditions. The equilibrium constant of the WGS reaction of Equation 1, referred to as $K_{WGS}$, is defined in Equation 2.

$$K_{WGS} = \frac{P(H_2) \cdot P(CO_2)}{P(CO) \cdot P(H_2O)} \qquad 2$$

where P refers to the partial pressures of the respective reagents/products under equilibrium conditions.

$K_{WGS}$ is strongly dependent on temperature, and the correlation between $K_{WGS}$ and temperature may be represented, at least over the temperature range of about 225 to about 375° C., using Equation 3.

$$K_{WGS} = 0.0102 \exp\frac{(4730)}{T}, \qquad 3$$

where T is the temperature in kelvin.

Figure 2:
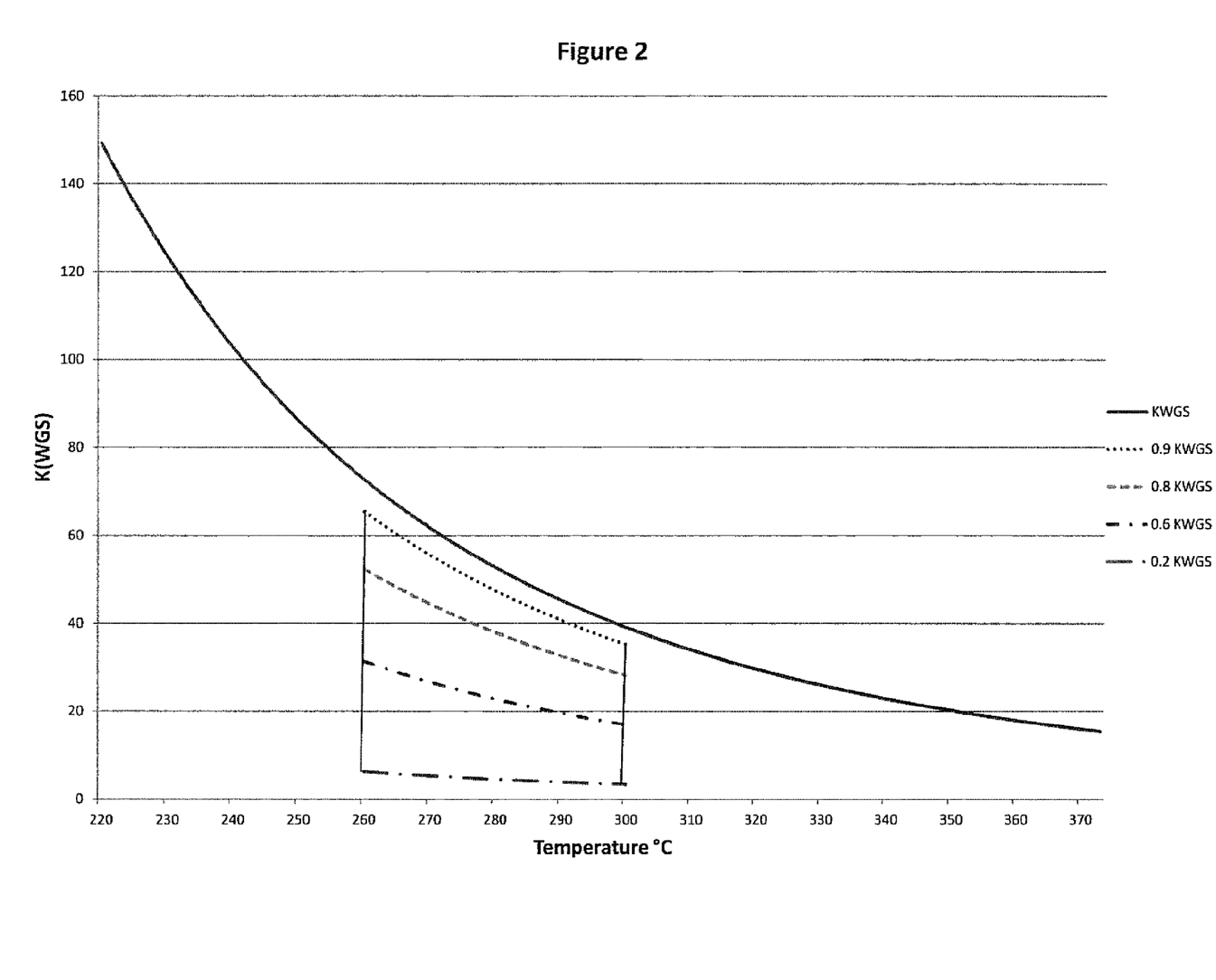
FIG. 2 shows a graph of the water gas shift reaction equilibrium constant ($K_{WGS}$) as a function of temperature.

With reference to FIG. 2, a plot of this correlation shows that the value of $K_{WGS}$ decreases with an increase in temperature. This implies that, as the reaction temperature of a Fischer-Tropsch synthesis process is increased, the formation of $CO_2$ via the forward reaction in Equation 1 advantageously becomes less favourable from a thermodynamic perspective.

However, it is also known that the WGS reaction has a higher activation energy than the Fischer-Tropsch synthesis reaction. This in turn implies that, as the reaction temperature is increased, the WGS reaction rate will increase more rapidly than the Fischer-Tropsch synthesis reaction rate, resulting in a higher $CO_2$ selectivity from a reaction kinetic perspective. In general, it would therefore be expected that an increase in Fischer-Tropsch synthesis reaction temperature will result in increased $CO_2$ selectivity up to a point where the thermodynamic equilibrium is approached. Also, since this thermodynamic equilibrium limit becomes lower as the operating temperature increases it should be reached relatively faster at higher Fischer-Tropsch synthesis reaction temperatures.

Iron-based catalysts are known to have an inherent propensity for the WGS reaction and are generally regarded as shifting FT catalysts. Unless limited by process conditions, a Fischer-Tropsch synthesis process employing an iron-based catalyst will have a significant selectivity towards $CO_2$. Other catalysts used in Fischer-Tropsch synthesis, for example those based on cobalt or ruthenium, have little activity for the WGS reaction and are therefore referred to as non-shifting FT catalysts.

Only iron-based and cobalt-based catalysts have been used commercially for Fischer-Tropsch synthesis. Cobalt-based catalysts have the advantages that they usually have a longer useful lifetime than iron-based catalysts and that they can tolerate higher water partial pressures in a Fischer-Tropsch reactor. The advantages of using iron-based catalysts include the relatively lower cost compared to that of cobalt-based catalysts, relatively high resistance to catalyst poisons typically present in synthesis gas, and a higher selectivity to high value olefins.

Iron-based catalysts have been applied commercially mainly in two modes of operation of a Fischer-Tropsch synthesis process, namely a High-Temperature Fischer-Tropsch (HTFT) mode and a Low-Temperature Fischer-Tropsch (LTFT) mode, as described in scientific literature, for example Fischer-Tropsch Technology by Steynberg and Dry ("Steynberg & Dry"), published as Studies in Surface Science and Catalysis Vol. 152, 2004. The HTFT process is usually performed in a fluidised bed reactor and is characterised by reaction temperatures of well above 300° C. This process typically produces mainly gasoline range hydrocarbons. The LTFT process is usually performed in a multi-tubular fixed bed reactor or in a slurry bubble column reactor. Reaction temperatures of the LTFT process are typically between 220° C. and 250° C. The product spectrum of the LTFT process is heavier and extends well into the wax range, at least in part due to the lower operating temperature. However, due to their shifting nature, the use of iron-based catalysts in Fischer-Tropsch synthesis is typically accompanied by a higher selectivity to $CO_2$, and conversely lower selectivity to desired hydrocarbon products.

Various approaches to limiting the production of $CO_2$ in Fischer-Tropsch synthesis processes when employing iron-based catalysts have been proposed and/or applied in the prior art. One such approach is to co-feed $CO_2$ with synthesis gas to a Fischer-Tropsch reactor and to operate the Fischer-Tropsch synthesis process at reactor conditions (in particular temperature) near the equilibrium of the WGS reaction of Equation 1, thereby to limit net $CO_2$ formation in the reactor. The mechanism leading to this limited net $CO_2$ formation is the reaching or exceeding of the WGS equilibrium. This approach of exploiting the WGS equilibrium is more favourable at higher Fischer-Tropsch reaction temperatures, as the WGS equilibrium becomes more favourable to suppress $CO_2$ formation due to the lower value of $K_{WGS}$ at higher temperatures.

Commercially, the Fischer-Tropsch synthesis process is usually operated under recycle. Typically the gaseous effluent from a Fischer-Tropsch reactor, which contains unreacted synthesis gas, some hydrocarbon product, and $CO_2$, is cooled and separated to provide a gaseous fraction containing (amongst others) $CO_2$ and a liquid fraction, containing condensed hydrocarbons and water, amongst others. The gaseous fraction containing the $CO_2$ is recycled to the inlet of the Fischer-Tropsch synthesis reactor. Those skilled in the art readily appreciate that operating a shifting Fischer-Tropsch synthesis process under tail gas recycle in the absence of $CO_2$ removal will lead to the build-up of $CO_2$ in the recycle loop, causing an increase of the $CO_2$ partial pressure inside the reactor. Under sufficiently high recycle ratios and applying appropriate operating conditions, the $CO_2$ level can theoretically build up to such an extent that the WGS equilibrium is reached, at which point net $CO_2$ formation via the WGS reaction ceases. However, due to the strong dependence of the WGS equilibrium constant ($K_{WGS}$) on temperature, this approach only becomes commercially feasible at temperatures above about 300° C. Indeed, as will be seen below, the prior art only teaches the use of this approach at such high Fischer-Tropsch hydrocarbon synthesis reactor operating temperatures. At lower temperatures, the extent of recycle required to effect WGS equilibrium in the reactor outlet would be excessive and unpractical to achieve commercially. In this latter case, a completely different solution has been applied in the prior art, as also considered below, with associated efficiency penalties.

U.S. Pat. No. 2,436,957 discloses a fluidised bed Fischer-Tropsch process aimed at the production of motor gasoline, i.e. a process associated with the High-Temperature Fischer-Tropsch (HTFT) mode of operation. U.S. Pat. No. 2,436,957 teaches that an iron powder catalyst may be employed for the dense phase fluidization conversion of synthesis gas at a temperature of 600° F. (315° C.). Operation of the process comprises dividing the effluent from the Fischer-Tropsch reactor into a major and a minor portion. The major portion is directly recycled to the Fischer-Tropsch reactor inlet, while $CO_2$ is stripped from the minor portion and a resultant substantially pure $CO_2$ stream is also recycled to the reactor inlet. It is taught that the value of the partial pressure ratio in the reactor outlet, $$\frac{P(H_2) \cdot P(CO_2)}{P(CO) \cdot P(H_2O)} \qquad 4$$

should be maintained well above the value of the WGS equilibrium constant ($K_{WGS}$) at the prevailing temperature. In other words, conditions must be created where $CO_2$ can be consumed via the reverse WGS reaction to form CO and $H_2O$. As highlighted by U.S. Pat. No. 2,436,957 the value of the WGS equilibrium constant ($K_{WGS}$) decreases notably with increasing temperature, and it is therefore expected that such conditions are only practically achievable at high operating temperatures in excess of 300° C.

U.S. Pat. No. 2,503,724 discloses a series arrangement of processes where the gaseous effluent of an isoparaffin synthesis is fed to a Fischer-Tropsch synthesis reactor. This allows $CO_2$ produced in the isoparaffin synthesis to suppress $CO_2$ formation in the Fischer-Tropsch synthesis reactor, or even create conditions in the Fischer-Tropsch synthesis reactor where $CO_2$ can be consumed by the reverse WGS to form CO and $H_2O$. This reference also highlights the fact that the equilibrium constant of the WGS reaction ($K_{WGS}$) decreases very significantly with reaction temperature, and a preferred Fischer-Tropsch reaction temperature of 315° C. is taught. The Fischer-Tropsch process is described to be a fluidised bed process aimed at the production of gasoline, which is indeed indicative of a High-Temperature Fischer-Tropsch (HTFT) process.

U.S. Pat. No. 2,594,301 discloses a fluidised bed Fischer-Tropsch synthesis process aimed at motor gasoline production. The process is operated under $CO_2$ recycle with water added to the reactor feed in order to suppress methane formation. In the example presented, the Fischer-Tropsch synthesis reactor is operated at 329° C. and the $CO_2$ selectivity is 9%, whereas the synthesis gas feed to the Fischer-Tropsch hydrocarbon synthesis reactor comprises about 1 volume % of $CO_2$. This reasonably low $CO_2$ selectivity is clearly a result of the low value of the WGS equilibrium constant ($K_{WGS}$) at the high reaction temperature, in combination with a large $CO_2$ recycle that causes $CO_2$ to build up in the reactor loop until the WGS equilibrium is attained. A related patent, U.S. Pat. No. 2,632,017, discloses a Fischer-Tropsch synthesis process aimed at motor gasoline production that is operated under recycle with a light paraffinic gas added to the reactor feed. The Fischer-Tropsch reactor of the example presented was operated at 315° C. and for similar reasons as mentioned before, the net $CO_2$ formation was suppressed.

The converse of the above therefore means that, at Fischer-Tropsch synthesis reaction temperatures below about 300° C., the WGS equilibrium ($K_{WGS}$) is so unfavourably high that very large quantities of $CO_2$ would have to be present in the feed to the Fischer-Tropsch reactor in order to limit $CO_2$ formation as a result of the forward WGS reaction. For such conditions, some prior art references teach a significantly different approach to that taught for operating Fischer-Tropsch synthesis at temperatures above 300° C.

For instance, U.S. Pat. No. 5,763,716, which is directed to the production of hydrocarbons well into the wax range and which teaches a preferred Fischer-Tropsch synthesis operating temperature of 250° C., recognises the problem of $CO_2$ formation when using iron-based catalysts. The Fischer-Tropsch synthesis process described in U.S. Pat. No. 5,763,716 produces a substantial amount of $CO_2$. However, operating at temperatures above 300° C. in order to reach near WGS equilibrium conditions for suppression of $CO_2$ formation is undesirable for the targeted product spectrum as such high reaction temperatures are associated with the formation of mainly gasoline range products. Therefore, it is taught in U.S. Pat. No. 5,763,716 that the $CO_2$ formed during the Fischer-Tropsch synthesis is separated from the tail gas from the Fischer-Tropsch synthesis and recycled to a natural gas reformer, where it serves to lower the $H_2/CO$ ratio of the synthesis gas produced in the reformer via the reverse WGS reaction of Equation 1 to form CO and $H_2O$. In other words, carbon lost to $CO_2$ in a Fischer-Tropsch reactor is recovered in the reformer as it is converted back to CO, which also serves the purpose of restoring the $H_2$ balance in the gas loop. It will be appreciated by those skilled in the art that the separation and recycle of $CO_2$ not only requires additional equipment such as a recycle compressor, but also requires a substantial amount of energy, such as the duty of the recycle compressor and the heat required to increase the temperature of the $CO_2$ to the high reaction temperature of the reformer. As a result, efficiency losses for such a process are anticipated.

The abovementioned prior art references therefore teach methods of limiting net $CO_2$ formation in a Fischer-Tropsch synthesis process employing a shifting FT catalyst, such as an iron-based catalyst and it can be distilled from the teachings of the prior art references that it is preferable in such instances to operate at reaction temperatures above 300° C. and employing a large recycle around the Fischer-Tropsch reactor thereby creating conditions at the reactor outlet where WGS equilibrium is attained or exceeded. However, the hydrocarbon product spectrum obtained in such instances is primarily in the gasoline range. Where the prior art teaches a method of operating a Fischer-Tropsch synthesis process employing a shifting FT catalyst at temperatures around 250° C., the product spectrum extends well into the wax range. However, in this instance the prior art teaches that it is required to recycle $CO_2$ to the synthesis gas generation step to recover some of the carbon that was lost to $CO_2$ in the Fischer-Tropsch synthesis step. This proposed solution to limit carbon loss is expected to lead to efficiency losses and increased capital costs.

A Fischer-Tropsch synthesis process employing a shifting catalyst, such as an iron-based catalyst, and operating at a temperature below 300° C., so that a product spectrum is produced which extends well into the wax range, but which shows an acceptably low $CO_2$ selectivity without requiring a large quantity of $CO_2$ in a Fischer-Tropsch synthesis gas feed would be desirable.

According to the invention there is provided a Fischer-Tropsch synthesis process, the process including:

feeding gaseous reactants including at least CO, $H_2$ and $CO_2$ into a reactor holding an iron-based catalyst, the $H_2$ and CO being fed in a $H_2$:CO molar ratio of at least 2:1 and the $CO_2$ and CO being fed in a $CO_2$:CO molar ratio of at least 0.5:1;

controlling the reactor at an operating temperature in the range from about 260° C. to about 300° C.; and withdrawing a liquid product and a gaseous product including hydrocarbons, CO, $H_2$, water and $CO_2$ from the reactor.

The $H_2$ and CO being fed may be in a $H_2$:CO molar ratio of at least about 2.5:1, preferably at least about 3:1, more preferably at least about 3.5:1, most preferably at least about 4:1, e.g. about 4.6:1. In other words, the gaseous reactants include an excess $H_2$ well above the stoichiometric requirements for Fischer-Tropsch synthesis, which is about 2.1:1.

The $CO_2$ and CO being fed may be in a $CO_2$:CO molar ratio of at least about 1:1.

Preferably, the $CO_2$ and CO being fed is in a $CO_2$:CO molar ratio of no more than about 4, preferably less than about 3, more preferably less than about 2.5. Even more preferably, the $CO_2$ and CO being fed is in a $CO_2$:CO molar ratio of no more than about 2:1, preferably less than about 2:1, more preferably less than about 1.5:1, e.g. about 1:1.

Preferably, the reactor is controlled at an operating temperature in the range from about 265° to about 285°, more preferably in the range from about 265° to about 275° C., most preferably in the range from about 268° C. to about 272° C., e.g. about 270° C.

Iron-based catalysts are known to have an inherent propensity for the WGS reaction and are generally regarded as shifting FT catalysts. Therefore it is expected that components of the WGS reaction will be present in the reactor at the above operating conditions. It would be expected that in the above operating temperature range the suppression of $CO_2$ formation in the reactor could be achieved by the continued increasing of the $CO_2$ content of the gaseous reactants to the extent that WGS equilibrium is reached or exceeded. However it has surprisingly been found that, at the operating conditions of the invention it is possible to suppress the $CO_2$ production despite WGS equilibrium not being reached. The approach to WGS equilibrium in the gaseous product withdrawn from the reactor, according to Equation 5 below, may be less than about 0.9.

$$\text{Approach to WGS equilibrium} = \frac{\frac{P(H_2) \cdot P(CO_2)}{P(CO) \cdot P(H_2O)}}{0.0102 \exp\frac{(4730)}{T}} \quad 5$$

where T is the operating temperature of the reactor in kelvin and P is the partial pressure of the gases CO, $CO_2$, $H_2$ and water vapour in the reactor at a gas outlet from the reactor. The partial pressure can be expressed in any unit of pressure measurement, but the same unit of measure must naturally be used for $P(H_2)$, $P(CO_2)$, $P(CO)$ and $P(H_2O)$.

Preferably, the approach to water gas shift equilibrium, according to Equation 5, is less than about 0.8, more preferably less than about 0.6.

Typically, the approach to water gas shift equilibrium, according to Equation 5, is at least about 0.2.

The process may include, in a synthesis gas generation stage, generating synthesis gas which includes at least CO and $H_2$ and thereafter feeding at least a portion of the synthesis gas to the reactor. The synthesis gas may form at least a part of the gaseous reactants into the reactor.

In the synthesis gas generation stage, a carbonaceous material, e.g. coal, may be gasified to provide a synthesis gas which includes at least CO and $H_2$. Instead, or in addition, the process may include, in the synthesis gas generation stage, reforming a hydrocarbonaceous material, e.g. natural gas or methane, to provide a synthesis gas which includes at least CO and $H_2$.

The gaseous reactants fed to the reactor typically may also include components other than CO, $H_2$ and $CO_2$, e.g. inerts, such as nitrogen, and light hydrocarbons, such as methane.

The liquid product and gaseous product withdrawn from the reactor may include hydrocarbons ranging from methane to hydrocarbons with a carbon number of at least 19. Preferably, at least 10 mass % of the hydrocarbons have a carbon number of at least 19. Even more preferably, at least 20 mass %, e.g. 24 mass %, of the hydrocarbons have a carbon number of at least 19.

During Fischer-Tropsch synthesis, water is also formed. At least some of the water is in gaseous form at the operating conditions of the reactor, as are CO, $CO_2$ and $H_2$, and possibly light hydrocarbons, such as methane and ethane. The gaseous product withdrawn from the reactor thus typically includes hydrocarbons, water, $CO_2$, CO and $H_2$.

The process typically includes recycling at least a portion of the gaseous product to the reactor as recycle gas, thereby returning $CO_2$ to the reactor.

The gaseous reactants fed into the reactor thus typically include the recycle gas, and a synthesis gas generated in a synthesis gas generation stage as hereinbefore described (hereinafter referred to as fresh synthesis gas). The recycle gas may be combined with the fresh synthesis gas prior to being fed into the reactor. Alternatively, the recycle gas and the fresh synthesis gas may be separately fed into the reactor.

Typically, at least a portion of the gaseous product withdrawn from the reactor is cooled to produce a condensed liquid phase including water which is separated from uncondensed gaseous product, with at least a portion of the uncondensed gaseous product then being recycled to the reactor as the recycle gas.

The process may include selecting a flow rate of the recycle gas to obtain the desired $H_2$:CO and $CO_2$:CO molar ratios for the gaseous reactants being fed to the reactor, as hereinbefore described.

Preferably, the volumetric flow rate of the recycle gas is at least about 50% of the volumetric flow rate of the gaseous reactants fed into the reactor, in normal $m^3$ per hour.

Preferably, the volumetric flow rate of the recycle gas is less than about 83%, more preferably less than about 80%, even more preferably less than about 75%, e.g. about 73%, of the volumetric flow rate of the gaseous reactants fed into the reactor.

The per pass conversion of CO in the reactor may be at least about 10%, preferably at least about 15%, more preferably at least about 25%, most preferably at least about 35%. The per pass conversion of CO is defined by equation 6:

$$\text{CO Conversion} = \frac{(CO_{in} - CO_{out}) \times 100}{CO_{in}} \quad 6$$

where
$CO_{in}$ is the molar flow of CO into the reactor; and
$CO_{out}$ is the molar flow of CO out of the reactor.

As is known to those skilled in the art, a high per pass conversion of CO is associated with a high partial pressure of reaction water in the reactor, which may be detrimental to the iron-based catalyst in the reactor. Preferably, the per pass conversion of CO in the reactor is no more than about 60%, more preferably no more than about 50%.

The reactor may be a slurry bubble column reactor.

Instead, the reactor may be a multi-tubular fixed bed reactor, although a slurry bubble column reactor is preferred.

The per pass $CO_2$ selectivity of the process may be less than about 25%, preferably less than about 20%, more preferably less than about 15%, most preferably less than about 10%, e.g. about 2.8%. The per pass selectivity of CO is defined by equation 7:

$$\text{CO2 Selectivity} = \frac{\text{CO2 produced} \times 100}{\text{CO converted}} \quad 7$$

where
$CO_2$ produced is molar outflow of $CO_2$ less molar inflow of $CO_2$; and
CO converted in molar inflow of CO less molar outflow of CO.

In addition to iron, the iron-based catalyst may further include at least one other transition metal or element as defined by IUPAC (Compendium of Chemical Technology Gold Book, Version 2.3.2 of 19 Aug. 2012). Preferably, iron forms more than about 10% by weight of the total transition metal content of the iron-based catalyst, more preferably at least about 20% by weight, and most preferably at least about 50% by weight of the transition metal content of the iron-based catalyst.

The iron-based catalyst may also include at least one promoter selected from the group of alkali metals, such as potassium and sodium. The iron-based catalyst may further include structural promoters, like silicon, alumina, or a combination thereof. The structural promoters may be modified by other metals such as Ti, Zr or Mo.

The gaseous reactants are typically fed at a low level or elevation into the reactor, i.e. into a bottom half, preferably into a bottom third, more preferably into a bottom quarter, even more preferably into a bottom 10% of a slurry bed of the reactor, when the reactor is a slurry bubble column reactor. Most preferably, the gaseous reactants are fed at or near a bottom of the reactor or slurry bed, when the reactor is a slurry bubble column reactor. The gaseous reactants and any gaseous product assist in maintaining the solid iron-based catalyst particles in suspension in a suspension liquid as they pass upwardly through the slurry bed, and with any liquid product forming together with the suspension liquid, a liquid phase of the slurry bed.

The liquid product and gaseous product withdrawn from the reactor may include oxygenated hydrocarbons, e.g. ethanol.

The iron-based catalyst may be prepared by a precipitation method, such as that described in Steynberg & Dry. A salt of iron, such as iron nitrate is dissolved in water and then precipitated with an alkali solution, e.g. $Na_2CO_3$ to form a precipitate of one or more iron oxides. Promoters such as copper may be precipitated with the iron. The precipitate is recovered from the solution and washed to remove alkali ions. After washing, a binder such as silica or alumina is typically added to the precipitate. The silica can be added as potassium waterglass. Optionally, the precipitate may be impregnated with additional promoters such as potassium. The precipitate is then shaped and dried to form particulate catalyst, for example by means of spray-drying to obtain fine spherical particles suitable for slurry bed reactor application, or by extrusion and drying to produce larger particles suitable for fixed bed reactor application.

The catalyst particles may have a desired particle size range, e.g. no catalyst particles greater than 300 microns and less than 5% by mass of the catalyst particles being smaller than 22 microns.

When the reactor is a slurry bubble column reactor, the process may include allowing the gaseous product to disengage from the slurry bed into a head space above the slurry bed, with the gaseous product then being withdrawn from the head space.

The process may include withdrawing the liquid product from the slurry bed to maintain the slurry bed at a desired level inside the reactor.

The reactor may be operated at a pressure elevated above atmospheric pressure, e.g. a predetermined operating pressure in the range of from about 10 to about 60 bar, preferably from about 20 bar to about 50 bar, more preferably from about 25 bar to about 50 bar.

The process may include operating the reactor, when the reactor is a slurry bubble column reactor, such that the slurry bed is in a heterogeneous or churn-turbulent flow regime and comprises a dilute phase consisting of fast-rising large bubbles of gaseous reactants, and, possibly gaseous product, which traverse the slurry bed virtually in a plug flow manner, and a dense phase comprising liquid phase, i.e. liquid product, solid catalyst particles, and entrained smaller bubbles of gaseous reactants and, possibly, gaseous product.

When the reactor is a slurry bubble column reactor, the process preferably includes allowing slurry to pass downwardly from a high level in the slurry bed to a lower level thereof, e.g. using slurry redistribution means or slurry redistributors known in the art, thereby to redistribute solid particles within the slurry bed.

The invention will now be described in more detail with reference to the accompanying diagrammatic drawings and the examples.

Figure 1:
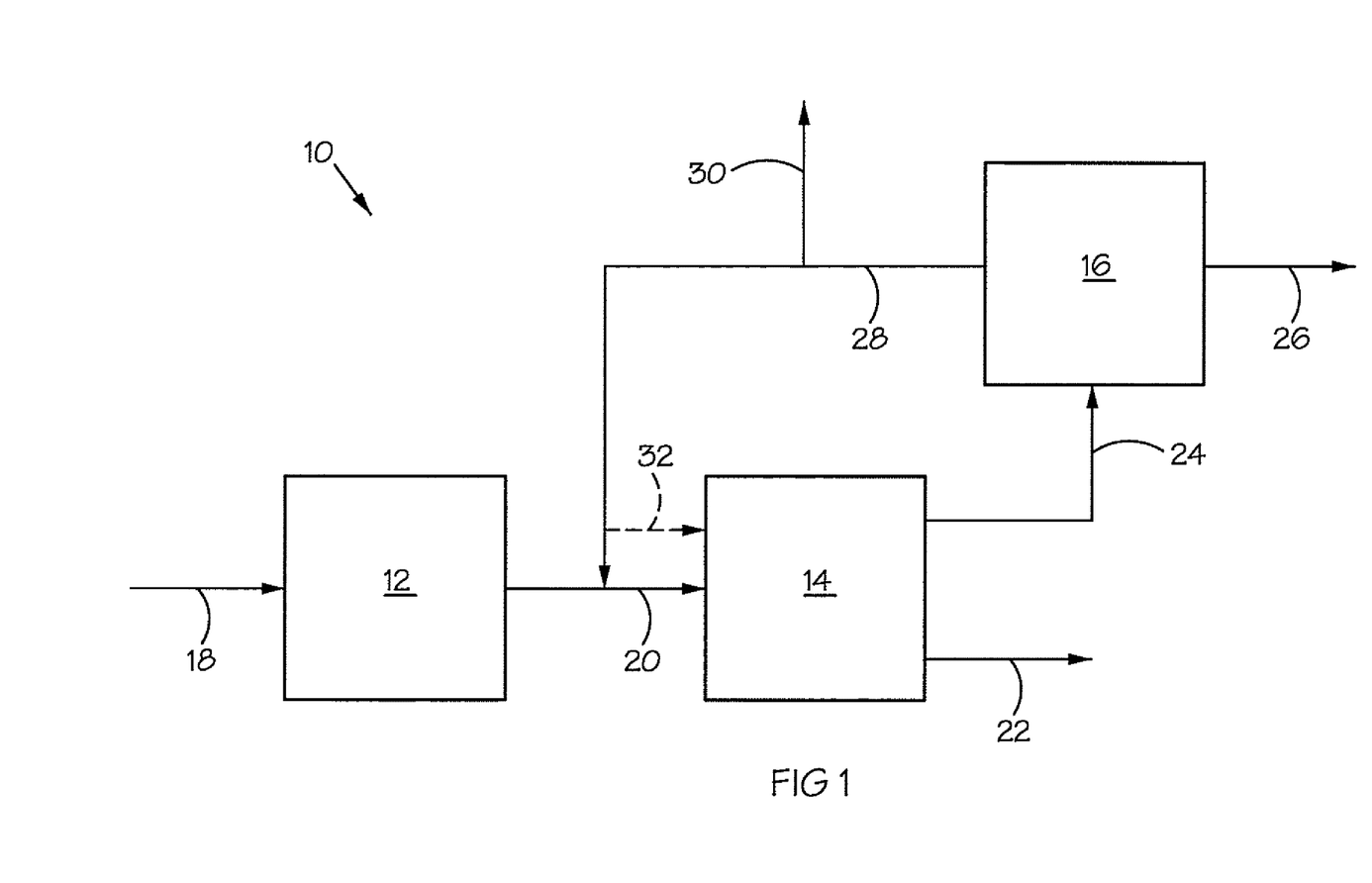
FIG. 1 shows a Fischer-Tropsch synthesis process in accordance with the invention.

Referring to FIG. 1 of the drawings, a Fischer-Tropsch synthesis process in accordance with the invention is generally indicated by reference numeral 10. The process 10 broadly includes a synthesis gas generation stage 12, a Fischer-Tropsch synthesis stage 14 and a cooling and separation stage 16.

A feed line 18 for a carbonaceous or hydrocarbonaceous material leads to the synthesis gas generation stage 12. A synthesis gas feed line 20 leads from the synthesis gas generation stage 12 to the Fischer-Tropsch synthesis stage 14.

The Fischer-Tropsch synthesis stage 14 is provided with a liquid product withdrawal line 22 and a gaseous product withdrawal line 24. The gaseous product withdrawal line 24 leads to the cooling and separation stage 16, which is provided with a condensed liquid phase withdrawal line 26 and a recycle gas line 28. The recycle gas line 28 leads from the cooling and separation stage 16 to the synthesis gas feed line 20. A purge line 30 branches off from the recycle gas line 28.

In the process 10, a hydrocarbonaceous material (natural gas in the embodiment illustrated in FIG. 1), is fed along the feed line 18 to the synthesis gas generation stage 12. In the synthesis gas generation stage 12, the methane in the natural gas is reformed to provide synthesis gas which includes at least $H_2$ and CO, with the synthesis gas then being withdrawn by means of the synthesis gas feed line 20 for feeding to the Fischer-Tropsch synthesis stage 14 as gaseous reactants. The synthesis gas generation stage 12 may be any synthesis gas generation stage operable to produce a synthesis gas suitable for Fischer-Tropsch synthesis. The synthesis gas generation stage 12 may employ combinations of more than one synthesis gas generation technology. For example, the synthesis gas generation stage 12 may be supplied with different carbonaceous and/or hydrocarbonaceous feedstocks. Thus, for example, a combination of coal gasification and reforming of a Fischer-Tropsch tail gas may be employed in the synthesis gas generation stage 12, or combinations of different natural gas reforming technologies such as partial oxidation reforming, auto-thermal reforming and steam reforming may be employed in the synthesis gas generation stage 12. Reforming of a hydrocarbonaceous material such as natural gas is preferred over gasification of a carbonaceous material such as coal.

The synthesis gas withdrawn from the synthesis gas generation stage 12 may optionally be subjected to one or more gas treatment steps, e.g. cleaning steps (not shown), where known Fischer-Tropsch catalyst poisons (e.g. $H_2S$, COS and/or $NH_3$), or other components, are removed from the synthesis gas prior to the synthesis gas being fed to the Fischer-Tropsch synthesis stage 14. The synthesis gas may also be subjected to one or more steps (not shown) to adjust the composition thereof, e.g. water gas shift and/or $CO_2$ removal.

The operation of a suitable synthesis gas generation stage 12 and the use of optional synthesis gas treatment steps and optional composition adjustment steps upstream of a Fischer-Tropsch synthesis stage are well-known to those skilled in the art and these process features are thus not described in any detail. Similarly, the operation of a Fischer-Tropsch synthesis stage such as the Fischer-Tropsch synthesis stage 14 is well-known to those skilled in the art and is also not described in any detail.

The synthesis gas in the synthesis gas feed line 20 is mixed with recycle gas from the recycle gas line 28 before the resultant gas stream is fed to the Fischer-Tropsch synthesis stage 14 as gaseous reactants. The recycle gas is rich in $CO_2$ and typically also includes unreacted $H_2$ meaning that the use of the recycle gas increases the $CO_2$:CO molar ratio and typically also the $H_2$:CO molar ratio of the gaseous reactants being fed into the Fischer-Tropsch synthesis stage 14. The desired $H_2$:CO molar ratio and the $CO_2$:CO molar ratio of the gaseous reactants can also be achieved by adjusting the composition of the synthesis gas from the synthesis gas generation step, e.g. in a composition adjustment step, such as water gas shift step or $CO_2$ removal. As will be appreciated, instead of feeding the recycle gas into the synthesis gas feed line 20 as shown in FIG. 1, the recycle gas can be fed directly to the Fischer-Tropsch synthesis stage 14 without first combining the recycle gas with the synthesis gas from the synthesis gas generation stage 12, as indicated by the broken line 32 in FIG. 1.

In any event, irrespective of the method used to recycle $CO_2$ to the Fischer-Tropsch synthesis stage 14, the flow rate of recycled $CO_2$ (and typically also recycled $H_2$) fed to the Fischer-Tropsch synthesis stage 14 in the form of recycle gas is such that the combined feed of gaseous reactants fed to the Fischer-Tropsch synthesis stage 14 has a $H_2$:CO molar ratio of at least 2:1, e.g. about 3:1. The CO2 and CO in the gaseous reactants are present in a $CO_2$:CO molar ratio of at least 0.5:1, but no more than 4, preferably less than 2:1, e.g. about 1:1.

The Fischer-Tropsch synthesis stage 14 includes at least one Fischer-Tropsch synthesis reactor holding an iron-based catalyst. In the embodiment of the invention illustrated, the reactor of the Fischer-Tropsch synthesis stage 14 is a slurry bubble column reactor. In the reactor, a portion of the gaseous reactants fed to the reactor is converted in the presence of the iron-based Fischer-Tropsch catalyst to hydrocarbons via the well-known Fischer-Tropsch synthesis, which is a highly exothermic process. The reactor is controlled at an operating temperature in the range from 260° C. to 300° C., e.g. about 270° C. Typically, the reactor operating temperature is controlled by controlling the amount of heat removed from the reactor by means of a steam generating cooling circuit (not shown), as is well-known to those skilled in the art.

The reactor is typically operated at a pressure in the range of from about 10 bar to about 50 bar, e.g. about 25 bar.

In the reactor of the Fischer-Tropsch synthesis stage 14 and at the operating temperature and pressure of the reactor, hydrocarbons produced by the Fischer-Tropsch synthesis include gaseous hydrocarbons as well as liquid hydrocarbons that extend well into the wax range. In the temperature range of about 260° C. to about 300° C., the Fischer-Tropsch hydrocarbons produced in the reactor in the presence of the iron-based catalyst include economically significant amounts of valuable olefins in the $C_6$ to $C_{14}$ range.

As is known to those skilled in the art, water is a byproduct produced by the Fischer-Tropsch reaction. As is also known to those skilled in the art, iron-based catalysts have an inherent propensity for the WGS reaction. Consequently, a portion of the CO fed to the Fischer-Tropsch synthesis stage 14 as part of the gaseous reactants reacts with the water and is converted to $CO_2$ according to the WGS reaction of Equation 1. The reactor thus produces, in addition to hydrocarbons (which are in liquid and gaseous form at the operating conditions of the reactor), water, $CO_2$ and $H_2$.

It is preferred that the per pass conversion (molar conversion) of CO in the Fischer-Tropsch synthesis stage 14 should be more than 10% but preferably less than about 60%. On the one hand, a too low per pass CO conversion is undesirable since a very high gas recycle rate to the Fischer-Tropsch synthesis stage 14 will be required in order to achieve an acceptable overall conversion of CO (i.e. to prevent excessive carbon loss), which results in an increase in the associated costs, e.g. the cost of recompressing the recycle gas. On the other hand, a too high per pass conversion of CO, which is associated with a high partial pressure of water present in the reactor, will be detrimental since the iron-based catalyst could be damaged by a high water partial pressure in the reactor.

As will be appreciated, as a result of the restricted per pass CO conversion, some of the CO (and thus also some of the $H_2$, which in any event is present in the reactor in stoichiometric excess) fed to the Fischer-Tropsch synthesis stage 14 will remain unreacted.

The process 10 includes withdrawing gaseous product, which thus includes CO and $H_2$, $CO_2$ water (water vapour) and gaseous hydrocarbons formed by the Fischer-Tropsch synthesis, from the Fischer-Tropsch synthesis stage 14 by means of the gas withdrawal line 24.

Fischer-Tropsch liquid product is withdrawn from the Fischer-Tropsch synthesis stage 14 by means of the liquid product withdrawal line 22. Withdrawal of liquid product, i.e. liquid phase from the slurry bed of the slurry bed reactor of the Fischer-Tropsch synthesis stage 14 also serves to maintain the slurry bed at a desired level inside the reactor. The liquid product withdrawn by means of the liquid product withdrawal line 22 is typically fed to downstream units for further processing into final products.

It is to be noted however that in alternative embodiments of the invention (not shown) it is possible for the liquid and gaseous product to leave the Fischer-Tropsch synthesis stage 14 as a combined stream which is then fed to a separation stage where the liquid product and a gaseous product are separated.

The gaseous product withdrawn from the Fischer-Tropsch synthesis stage 14 by means of the gas withdrawal line 24 is fed to the cooling and separation stage 16 where the gaseous product is cooled to produce a condensed liquid phase including water and other components that condense at the conditions in the cooling and separation stage 16. The condensed liquid phase is separated in the cooling and separation stage 16 from uncondensed gaseous product and withdrawn by means of the condensed component withdrawal line 26 for further processing which typically includes separation of reaction water from valuable hydrocarbons.

The uncondensed gaseous product which includes $H_2$, CO, and $CO_2$ is withdrawn from the cooling and separation stage 16 by means of the recycle gas line 28 and recycled as recycle gas to the Fischer-Tropsch synthesis stage 14 as hereinbefore described. A portion of the uncondensed gaseous product from the cooling and separation stage 16 may be purged by means of the purge line 30 to control the accumulation of $CO_2$ and inerts, e.g. nitrogen, in the process 10.

It will be appreciated that the invention is not limited to a process such as the process 10 where a single synthesis gas feed stream from a synthesis gas generation stage is combined with a single recycle gas stream to form a single total feed stream which is introduced into a Fischer-Tropsch reactor. The invention can, for example, equally well be applied in a process where one or more fresh synthesis gas feed streams are introduced separately from a $CO_2$-containing recycle gas stream into a Fischer-Tropsch reactor. Under such circumstances, the total gaseous reactants feed composition and flow rate fed into the reactor is simply the composition and flow rate of a stream that would have formed had all fresh synthesis gas streams and recycle gas streams been combined prior to entry into the reactor. Similarly, the gas recycle ratio can be defined as the volumetric flow rate of recycle gas divided by the volumetric flow rate of gaseous reactants, which is the sum of all the fresh synthesis gas streams and the recycle gas stream(s), irrespective of whether said streams are physically combined prior to entering the reactor.

At the conditions described for the process 10, i.e. a relatively low Fischer-Tropsch reactor operating temperature and relatively low $CO_2$ feed concentration (i.e. a relatively low $CO_2$:CO molar ratio) to the Fischer-Tropsch reactor, it would be expected that the forward reaction of the water gas shift reaction would be favoured, resulting in a large production of $CO_2$ in the Fischer-Tropsch synthesis stage 14. Surprisingly, it has however been found for the process of the invention that this is not the case. Instead, at the described operating conditions, the $CO_2$ production in the Fischer-Tropsch synthesis stage 14 is reduced even though the conditions (i.e. partial pressures of CO, $H_2O$, $CO_2$ and $H_2$) at the point where gaseous products are withdrawn from the Fischer-Tropsch reactor are still far from the water gas shift equilibrium at the operating temperature of the Fischer-Tropsch reactor.

FIG. 2 illustrates the operating regime or envelope for the process according to some embodiments of the invention. Operating conditions for the Fischer-Tropsch synthesis stage 14, e.g. reactor feed stream composition, tail gas recycle rate, reactor temperature and pressure, catalyst loading and residence time of reactants are selected such that the reactor or reactors is/are operating at a temperature between about 260° C. and about 300° C., at an equilibrium constant for the WGS reaction ($K_{WGS}$) according to Equation 2, falling between the graphs for 0.2 $K_{WGS}$ and 0.9 $K_{WGS}$, preferably between the graphs for 0.2 $K_{WGS}$ and 0.8 $K_{WGS}$, more preferably between the graphs for 0.2 $K_{WGS}$ and 0.6 $K_{WGS}$.

Advantageously, by operating at the conditions described herein it is thus not necessary to achieve water gas shift equilibrium in order to suppress $CO_2$ formation during Fischer-Tropsch synthesis using an iron-based catalyst. This in turn negates the need for a large gas recycle rate as taught in the prior art when carrying out Fischer-Tropsch synthesis at a temperature below 300° C. Further, as illustrated in the following examples, a higher $H_2$:CO molar ratio by itself is not sufficient to lower the $CO_2$ selectivity, but it is necessary simultaneously to increase the amount of $CO_2$ being fed to the Fischer-Tropsch synthesis stage in order to observe a considerable reduction in the $CO_2$ selectivity. Similarly, an increase in the $CO_2$:CO molar ratio alone is not sufficient to reduce $CO_2$ production in the Fischer-Tropsch synthesis stage 14. Thus, also the $H_2$:CO molar ratio needs to be raised simultaneously with an increase in the $CO_2$:CO molar ratio.

At a reactor temperature in the operating temperature range for the process of the invention, it would be expected that the suppression of $CO_2$ formation in the Fischer-Tropsch synthesis stage 14 could be achieved by the continued increasing of the $CO_2$ content of the feed to the Fischer-Tropsch synthesis stage 14 to the extent that water gas shift equilibrium is reached. However, such a suggestion would lead to an uneconomical process, particularly in a process where the $CO_2$ is provided by recycle of tail gas derived from the Fischer-Tropsch synthesis stage 14, as in the process 10, as this would mean an economically unfeasible high recycle rate to achieve water gas shift equilibrium. Advantageously, the process 10 of the invention, as illustrated, provides an alternative approach to reducing the $CO_2$ selectivity in a Fischer-Tropsch synthesis process when employing a shifting Fischer-Tropsch catalyst such as an iron-based catalyst. Surprisingly, by operating the Fischer-Tropsch synthesis stage or reactor at a temperature between about 260° C. and about 300° C., at the selected ranges for the $H_2$:CO and $CO_2$:CO molar ratios, the inventors have found that it is possible to reduce the $CO_2$ selectivity below 25%, without requiring operation of the Fischer-Tropsch synthesis stage at the water gas shift equilibrium.

In addition to the suppression of the overall $CO_2$ production, the Fischer-Tropsch product obtained from the Fischer-Tropsch synthesis process of the invention advantageously extends into the wax range and contains economically significant amounts of primarily linear α-olefins. Moreover, the ability to operate at a higher temperature than the typical LTFT synthesis process leads to a favourable reaction rate for the Fischer-Tropsch synthesis reaction.

EXAMPLES

A number of experimental examples are provided. In the examples provided, the terms "example" and "experiment" have been used interchangeably.

Example 1

A Fischer-Tropsch synthesis experiment was performed in a once-through laboratory scale slurry reactor.
Activation Method
A shifting iron-based Fischer-Tropsch catalyst promoted with copper and potassium, having a composition on a mass basis of 100Fe/5Cu/20SiO$_2$/5K$_2$O was added to a heavy wax fraction inside a slurry reactor. The slurry reactor was closed and pressurised with Argon to 15 bar. The temperature of the reactor was increased to 255° C., and at that temperature, synthesis gas having an $H_2$/CO molar ratio of 1.5 was passed through the reactor at a GHSV of 12000 ml(N)/g$_{catalyst}$/hr and maintained for 16 hours.
Fisher Tropsch Synthesis
Once the iron-based catalyst had been activated using the above method, the reactor temperature was increased to 270° C. The reactor used was equipped with a mechanical stirrer and the stirring rate was sufficiently high to ensure that the reactor operated like a continuous stirred tank reactor, i.e. void of any significant temperature or concentration gradients. Synthesis gas, having a $H_2$/CO molar ratio of 1.6, but containing no $CO_2$ was fed to the reactor and outlet gas from the reactor was measured with a gas chromatograph. Argon was co-fed with the synthesis gas as an internal standard to interpret the gas chromatograph data quantitatively. The experiment was performed at a reactor temperature of 270° C. The results of the experiment are presented in Table 1. The $CO_2$ selectivity was found to be very high (around 27%), as would be expected under these operating conditions.

Example 2

Example 2 was carried out following the same method as that of Example 1 and employed the same inlet $H_2$/CO molar ratio of 1.6, but in this case a substantial amount of $CO_2$ was added to the feed to the extent that the feed $CO_2$/CO molar ratio was 1.1. By suitably adjusting the reactor pressure and/or the flow rate of the Argon internal standard, it was ensured that the partial pressures of CO and $H_2$ in the reactor were kept similar to that of Example 1. The co-fed $CO_2$ hardly affected the $CO_2$ selectivity, as would be expected from prior art teachings, seeing that the conditions at the reactor outlet were still very far from thermodynamic equilibrium. The results of the experiment are presented in Table 1.

Example 3

Example 3 was carried out following the same method as that of Example 1, but was performed with an $H_2$/CO molar ratio of 4.6, and with no $CO_2$ in the reactor feed. The $CO_2$ selectivity was again high, at about 19%, again according to expectations from the prior art teachings. The results of the experiment are presented in Table 1.

Example 4

Example 4 was performed following the same method as that of Example 2, but with a similar inlet $H_2$/CO molar ratio as that of Example 3. However, $CO_2$ was added to the feed to obtain an inlet $CO_2$/CO molar ratio of 0.7 in accordance with the present invention. Again the reactor pressure and/or Argon flow rate was adjusted to achieve the CO and $H_2$ partial pressures in the reactor feed as for Example 3. The $CO_2$ selectivity (around 10%) was substantially lower than in the case of Example 3. This means that the net $CO_2$ formation rate was suppressed substantially by the addition of $CO_2$ to the feed, despite the fact that the reactor outlet was still very far from thermodynamic equilibrium. The results of the experiment are presented in Table 1.

Example 5

Example 5 was also performed following the same method as that of Example 2. However, an even larger amount of $CO_2$ was added to the feed obtaining a $CO_2$/CO molar ratio of 2.3 which suppressed $CO_2$ formation to the point where the process had a net $CO_2$ selectivity close to that of a non-shifting Fischer-Tropsch process. This is despite the fact that conditions in the outlet were still very far from thermodynamic equilibrium. The results of the experiment are presented in Table 1.

Examples 6 to 12

Examples 6 to 12 were performed following the same method as that of Example 1, but sometimes with $CO_2$ being fed to the reactor. However, the $H_2$/CO and the $CO_2$/CO molar ratios were varied in a range of from 2 to 3 and from 0 to 1 respectively. The results show that a significant reduction in the $CO_2$ selectivity is achieved by raising the $H_2$/CO molar ratio above 2 and the $CO_2$/CO molar ratio above 0.5. The results also show that this reduction in $CO_2$ production is achieved even though WGS equilibrium has not been reached. The closest approach to WGS equilibrium, 55.4%, is obtained in the case of the highest $CO_2$/CO molar ratio of 2.3 and the highest $H_2$/CO molar ratio, and at such conditions a $CO_2$ selectivity of 2.8% is achieved, which is very close to that typically seen for cobalt-based catalyst (non-shifting catalyst). The results of the experiments are presented in Table 1.

TABLE 1

Experimental results for Examples 1-12

| | Experiment number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $H_2/CO$ inlet (molar ratio) | 1.6 | 1.6 | 4.6 | 4.5 | 4.1 | 2.0 | 2.0 | 2.5 | 2.5 | 3.0 | 3.0 | 2.0 |
| $CO_2/CO$ inlet (molar ratio) | 0.0 | 1.1 | 0.0 | 0.7 | 2.3 | 0.0 | 1.0 | 0.0 | 1.0 | 0.0 | 1.0 | 0.5 |
| $H_2/CO$ outlet (molar ratio) | 1.9 | 1.8 | 8.1 | 7.1 | 5.6 | 3.1 | 2.8 | 4.1 | 3.8 | 5.4 | 4.8 | 2.6 |
| $CO_2/CO$ outlet (molar ratio) | 0.3 | 2.3 | 0.2 | 1.5 | 3.9 | 0.4 | 2.5 | 0.3 | 2.5 | 0.3 | 2.4 | 1.2 |
| Conversion %: $H_2$ | 39.6 | 39.3 | 19.1 | 17.8 | 18.6 | 37.1 | 37.6 | 31.5 | 31.5 | 26.4 | 26.6 | 33.0 |
| Conversion %: CO | 51.3 | 47.5 | 53.9 | 47.9 | 40.2 | 59.3 | 55.1 | 59.1 | 54.5 | 59.0 | 53.8 | 49.5 |
| Conversion %: CO + $H_2$ | 44.2 | 42.5 | 25.3 | 23.3 | 22.8 | 44.5 | 43.5 | 39.5 | 38.1 | 34.5 | 33.4 | 38.5 |
| $CO_2$ selectivity (molar %) | 26.8 | 26.7 | 18.7 | 10.1 | 2.8 | 26.0 | 20.5 | 23.9 | 19.7 | 23.6 | 17.0 | 24.8 |
| $CH_4$ selectivity (mass %) | 2.6 | 2.9 | 5.7 | 5.5 | 4.3 | 2.6 | 2.8 | 4.7 | 5.0 | 7.1 | 6.8 | 5.6 |
| Equilibrium constant | 61.9 | 61.9 | 61.9 | 61.9 | 61.9 | 61.9 | 61.9 | 61.9 | 61.9 | 61.9 | 61.9 | 61.9 |
| $P(H_2) \cdot P(CO_2)/P(CO) \cdot P(H_2O)$ | 1.1 | 10.1 | 2.4 | 14.6 | 34.3 | 1.7 | 9.4 | 1.9 | 12.7 | 2.4 | 14.7 | 6.4 |
| Approach to Equilibrium (%) | 1.8 | 16.3 | 3.9 | 23.5 | 55.4 | 2.7 | 15.1 | 3.1 | 20.6 | 3.9 | 23.7 | 10.4 |
| Reactor outlet partial pressures (bar) | | | | | | | | | | | | |
| $H_2$ | 8.7 | 8.7 | 14.4 | 14.4 | 13.9 | 9.6 | 9.6 | 12.2 | 12.3 | 13.7 | 13.7 | 11.2 |
| CO | 4.4 | 4.7 | 1.8 | 2.0 | 2.5 | 3.1 | 3.5 | 3.0 | 3.3 | 2.5 | 2.9 | 4.3 |
| $H_2O$ | 2.2 | 2.0 | 1.3 | 1.5 | 1.6 | 2.2 | 2.5 | 2.2 | 2.4 | 1.9 | 2.2 | 2.1 |
| $CO_2$ | 1.3 | 11.1 | 0.4 | 3.1 | 9.6 | 1.2 | 8.6 | 1.0 | 8.0 | 0.9 | 6.7 | 5.2 |

Example 13

Figure 3:
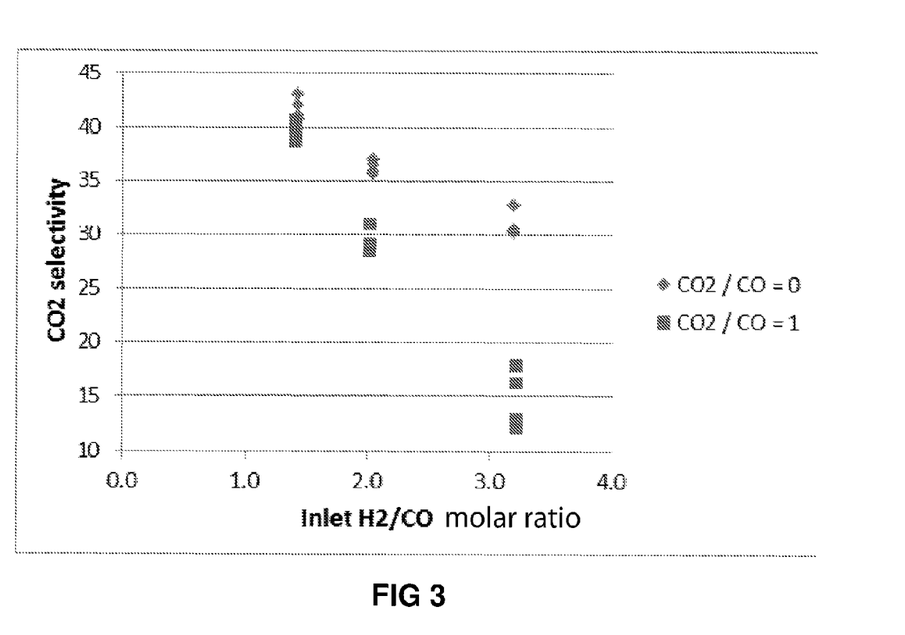
FIG. 3 shows a graph of $CO_2$ selectivity as a function of the $H_2$:CO molar ratio and $CO_2$:CO molar ratio, according to Example 13.

Fischer-Tropsch synthesis experiments were performed in the same reactor and under the same reactor conditions as those of Example 1 and at the same temperature of 270° C. However, the Fischer-Tropsch synthesis was performed in the presence of a shifting iron-based Fischer-Tropsch catalyst promoted with potassium, having a composition on a mass basis of 100Fe/4.4Si/1.2K. The catalyst is a Low Alpha catalyst obtained from CAER (University of Kentucky). The iron-based catalyst was activated following the same activation method of Example 1. The experiments were initially carried out in the absence of $CO_2$ in the feed to the reactor, and the $H_2/CO$ molar ratio was varied from 1.5 to 3. Then $CO_2$ was added to the feed at a $CO_2$:CO molar ratio of 1, and the $H_2$:CO molar ratio was varied according to the initial experiment. The results of the experiments are presented in FIG. 3. As it is apparent, while increasing the $H_2$:CO ratio does have an effect in decreasing the $CO_2$ selectivity, it is only at the addition of $CO_2$ at a $CO_2$:CO molar ratio of above 0.5 in the feed that a significant reduction in the $CO_2$ selectivity is seen. At these conditions the WGS equilibrium is not reached. The approach to WGS equilibrium in the case of the absence of $CO_2$ in the feed into to the reactor was reported to be in the range of from about 9 to about 15%. In the case of $CO_2$ being fed together with the synthesis gas into the reactor, the approach to WGS equilibrium was reported to be in the range of from about 23 to about 37%, which is significantly low.

Examples 14 & 15

Examples 14 and 15 were performed following the same method as that of Example 1, with $CO_2$ being fed to the reactor in both instances. The CO, $H_2$ and $CO_2$ were fed into the reactor at $H_2/CO$ and the $CO_2/CO$ molar ratios of 4.4 and 1.6 respectively (Example 14), and 4.2 and 2.3 respectively (Example 15). In each instance, the selectivities of hydrocarbons with a carbon number of at least 5 (C5+), carbon number of at least 10 (C10+), and a carbon number of at least 19 (C19+) were measured using a gas chromatograph. The selectivities are provided in Table 2 below, and expressed as a fraction (in percentage) of the total hydrocarbons product, i.e. excluding the $CO_2$ in the product.

TABLE 2

Experimental results for Examples 14 & 15

| Experiment number | 14 | 15 |
|---|---|---|
| $H_2/CO$ inlet (molar ratio) | 4.4 | 4.2 |
| $CO_2/CO$ inlet (molar ratio) | 1.6 | 2.3 |
| $H_2/CO$ outlet (molar ratio) | 6.0 | 5.2 |
| C5+ Hydrocarbon Selectivity (mass %) | 59.5 | 61.8 |
| C10+ Hydrocarbon Selectivity (mass %) | 33 | 29.5 |
| C19+ Hydrocarbon Selectivity (mass %) | 24 | 24.2 |

Example 4A and 5A

The results of Experiments 4 and 5 were used to construct design cases for implementing the invention as a commercial Fischer-Tropsch synthesis reactor operated under recycle. The results are presented in Table 2 for purposes of illustration. With fresh feed synthesis gas compositions that can realistically be achieved on a commercial scale, and operating the reactors under recycle, the inlet and outlet reactor conditions of the experimental runs could be matched. As can be seen from Table 2, high overall conversions can be achieved. This shows that the invention can be implemented as a feasible commercial process at industrial scale, contrary to expectations from the prior art. The process designs based on Experiments 4 and 5 can of course be further improved with optimisation approaches known to those skilled in the art, e.g. by developing reliable Fischer-Tropsch process models that can predict reactor performance over a range of conditions so that a Fischer-Tropsch synthesis stage operated in accordance with the invention can be optimally integrated with a synthesis gas generation stage.

TABLE 3

Reactor design information based on the results of Examples 4 and 5

| Experiment number | 4A | 5A |
|---|---|---|
| Fresh Feed composition (mol %) | | |
| CO | 30.2 | 29.8 |
| $H_2$ | 67.8 | 63.9 |
| $CO_2$ | 2.0 | 6.3 |
| Fresh feed $H_2$/CO molar ratio | 2.2 | 2.1 |
| Overall CO conversion (%) | 89.7 | 93.9 |
| Overall $H_2$ conversion (%) | 67.7 | 84.1 |
| Overall synthesis gas conversion (%) | 74.5 | 87.2 |
| Recycle ratio | 2.7 | 4.5 |

The invention claimed is:

1. A Fischer-Tropsch synthesis process, the process including
   feeding gaseous reactants including at least CO, $H_2$ and $CO_2$ into a reactor holding an iron-based catalyst, the $H_2$ and CO being fed in a $H_2$:CO molar ratio of at least 2:1 and the $CO_2$ and CO being fed in a $CO_2$:CO molar ratio of at least 0.5:1;
   controlling the reactor at an operating temperature in the range from about 260° C. to about 300° C.; and
   withdrawing a liquid product and a gaseous product including hydrocarbons, CO, $H_2$, water and $CO_2$ from the reactor;
   wherein the approach to water gas shift equilibrium in the gaseous product withdrawn from the reactor, according to Equation 5, is less than 0.9

$$\text{Approach to WGS equilibrium} = \frac{\frac{P(H_2) \cdot P(CO_2)}{P(CO) \cdot P(H_2O)}}{0.0102 \exp\frac{(4730)}{T}} \quad 5$$

where T is the operating temperature of the reactor in kelvin and P is the partial pressure of the gases CO, $CO_2$, $H_2$ and water vapour in the gaseous product.

2. A Fischer-Tropsch synthesis process according to claim 1, wherein the $H_2$ and CO is being fed in a $H_2$:CO molar ratio of at least about 2.5:1.

3. A Fischer-Tropsch synthesis process according to claim 1, wherein the $CO_2$ and CO are fed in a $CO_2$:CO molar ratio of at least about 1:1.

4. A Fischer-Tropsch synthesis process according to claim 1, wherein the $CO_2$ and CO are fed in a $CO_2$:CO molar ratio of no more than about 4.

5. A Fischer-Tropsch synthesis process according to claim 4, wherein the $CO_2$ and CO are fed in a $CO_2$:CO molar ratio of no more than about 2:1.

6. A Fischer-Tropsch synthesis process according to claim 1, wherein the reactor is controlled at an operating temperature in the range from about 265° C. to about 285° C.

7. A Fischer-Tropsch synthesis process according to claim 1, wherein the approach to water gas shift equilibrium, according to Equation 5, is less than about 0.8.

8. A Fischer-Tropsch synthesis process according to claim 1, wherein the approach to water gas shift equilibrium, according to Equation 5, is at least about 0.2.

9. A Fischer-Trospch synthesis process according to claim 1, wherein at least 10 mass % of hydrocarbons in the liquid product and gaseous product withdrawn from the reactor have a carbon number of at least 19.

10. A Fischer-Tropsch synthesis process according to claim 9, wherein at least 20 mass % of the hydrocarbons in the liquid and gaseous products withdrawn from the reactor have a carbon number of at least 19.

11. A Fischer-Tropsch synthesis process according to claim 1, wherein at least a portion of the gaseous product withdrawn from the reactor is cooled to produce a condensed liquid phase including water which is separated from uncondensed gaseous product, and wherein at least a portion of the uncondensed gaseous product is recycled to the reactor as a recycle gas.

12. A Fischer-Tropsch synthesis process according to claim 11, wherein the volumetric flow rate of the recycle gas is at least about 50% of the volumetric flow rate of the gaseous reactants fed to the reactor.

13. A Fischer-Tropsch synthesis process according to claim 12, wherein the volumetric flow rate of the recycle gas is less than about 83% of the volumetric flow rate of the gaseous reactants fed to the reactor.

14. A Fischer-Tropsch synthesis process according to claim 1, wherein the per pass conversion of CO in the reactor is at least about 10%.

15. A Fischer-Tropsch synthesis process according to claim 1, wherein the per pass conversion of CO in the reactor is no more than about 60%, and/or wherein the $CO_2$ selectivity is less than about 25%.

16. A Fischer-Tropsch synthesis process according to claim 1, wherein the $H_2$ and CO is being fed in a $H_2$:CO molar ratio of at least about 3:1.

17. A Fischer-Tropsch synthesis process according to claim 1, wherein the $CO_2$ and CO are fed in a $CO_2$:CO molar ratio of less than about 3.

18. A Fischer-Tropsch synthesis process according to claim 1, wherein the reactor is controlled at an operating temperature in the range from about 265° to about 275° C.

19. A Fischer-Tropsch synthesis process according to claim 1, wherein the per pass conversion of CO in the reactor is at least about 15%.

20. A Fischer-Tropsch synthesis process according to claim 1, wherein the per pass conversion of CO in the reactor is no more than about 50%, and/or wherein the $CO_2$ selectivity is less than about 20%.

* * * * *